(12) United States Patent
Barnes et al.

(10) Patent No.: US 6,795,374 B2
(45) Date of Patent: Sep. 21, 2004

(54) BIAS CONTROL OF ELECTROSTATIC TRANSDUCERS

(75) Inventors: Stephen R. Barnes, Bellevue, WA (US); Robert N. Phelps, Sammamish, WA (US); Mirsaid Seyed Bolorforosh, Portola Valley, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 09/949,420

(22) Filed: Sep. 7, 2001

(65) Prior Publication Data

US 2003/0048698 A1 Mar. 13, 2003

(51) Int. Cl.$^7$ .............................. H04B 1/38; A61B 8/00
(52) U.S. Cl. ...................................... 367/138; 600/437
(58) Field of Search .......................... 367/138; 600/443, 600/459, 437

(56) References Cited

U.S. PATENT DOCUMENTS

| | | | |
|---|---|---|---|
| 5,471,723 A | 12/1995 | Lüder et al. | |
| 5,619,476 A | 4/1997 | Haller et al. | |
| 5,870,351 A | 2/1999 | Ladabaum | |
| 5,894,452 A | 4/1999 | Ladabaum | |
| 5,982,709 A | 11/1999 | Ladabaum et al. | |
| 6,004,832 A | 12/1999 | Haller et al. | |
| 6,292,435 B1 * | 9/2001 | Savord et al. | 367/138 |
| 6,461,299 B1 * | 10/2002 | Hossack | 600/437 |

OTHER PUBLICATIONS

Igal Ladabaum, "Surface Micromachined Capacitive Ultrasonic Transducers", May, 1998, pp. 678–690.
Suzuki; "A Silicon Electrostatic Ultrasonic Transducer"; 1989.
Kühnel et al.; "A Silicon Condenser Microphone With Structured Back Plate and Silicon Nitrade Membrane"; Nov. 12, 1991.
Haller et al.; "A Surface Micromachined Electrostatic Ultrasonic Air Transducer"; 1994.
Schindel et al.; "The Design and Characterization of Micromachined Air–Coupled Capacitance Transducers"; 01/1995.
Eccardt; "Surface Micromachined Ultrasound Transducers in CMOS Technology"; 01/1996.
Ladabaum et al.; "Silicon Micromachined Ultrasonic Immersion Transducer"; Oct. 1, 1996.
Eccardt et al.; "Micromachined Transducers for Ultrasound Applications"; 1997.
Eccardt; "Micromachined Ultrasound Transducers with Improved Coupling Factors from a CMOS Compatible Process"; 07/1999.
Niederer et al.; "Micromachined Transducer Design for Minimized Generation of Surface Waves"; 10/1999.

* cited by examiner

Primary Examiner—Ian J. Lobo (57) ABSTRACT

A method and system for controlling bias voltage for use with an electrostatic transducer are provided. The bias voltage is dynamically varied or set as a function of imaging mode, depth gain compensation, elevational apodization, azimuthal apodization, timing with respect to the transmit waveform, center frequency of transmit and receive waves and desired modulation. Opposite polarity on sub-elements is also provided for removing signals from electromagnetic interference and crosstalk between elements.

48 Claims, 5 Drawing Sheets

BIAS CONTROL OF ELECTROSTATIC TRANSDUCERS

BACKGROUND

This invention relates to capacitive membrane ultrasound transducers (cMUTs). In particular, the invention relates to bias voltages used with electrostatic transducers.

Electrostatic transducers, such as micro-machined capacitance based electrostatic transducers, offer many advantages over traditional ceramic transducers. For example, electrostatic transducers may be cheaper to manufacture, allow higher manufacturing yields, provide more size and shape options, use non-toxic materials, and have higher bandwidth. However, electrostatic transducers require a bias voltage for operation. The bias voltage in combination with any transmit voltage is limited to avoid collapse of the membrane. The electrostatic attraction of the membrane cannot exceed the membrane tension. Likewise, the dielectric breakdown of the gap between electrodes cannot be exceeded. The bias voltage should also be larger than the peak voltage of the transmit voltage to avoid harmonic distortion.

The magnitude of the transmit voltage waveform sets a requirement on the bias voltage. Accordingly, the bias voltage is set for operation during transmit and is not optimum for operation during reception of acoustic signals.

BRIEF SUMMARY

The present invention is defined by the following claims, and nothing in this section should be taken as a limitation on those claims. By way of introduction, the preferred embodiment described below includes a method and system for operating a capacitive membrane ultrasound transducer. The bias voltage applied to one or more elements of the transducer is controlled for optimum performance.

In a first aspect, a bias voltage is applied to the transducer in a receive mode. The bias voltage is varied as a function of time, such as to provide for depth gain compensation.

In a second aspect, a bias voltage is applied to the transducer. Different bias voltages are applied to elevationally spaced sub-elements of one of the multiple elements of the transducer.

In a third aspect, a bias voltage is applied to the transducer. The bias voltage is varied as a function of the imaging mode of operation.

In a fourth aspect, a bias voltage is applied to the transducer. A radio frequency signal is applied with the bias voltage.

In a fifth aspect, a first bias voltage is applied to an element in a receive mode. A second different bias voltage is applied to the element in a transmit mode. A transmit waveform is applied to the element. The bias is changed from the first to the second bias voltage substantially simultaneously with a beginning of the transmit waveform.

In a sixth aspect, a first bias voltage is applied to a first sub-element of one of the elements of the transducer. A second, reversed polarity bias voltage is applied to a second sub-element of the element.

Further aspects and advantages of the invention are discussed below in conjunction with the preferred embodiments.

DETAILED DESCRIPTION OF THE PREFERRED EMBODIMENTS

Controlling the bias voltage applied to elements controls performance of a CMUT. The bias voltage can be increased during a receive period to increase sensitivity and provide depth gain compensation. Applying different bias voltages to elevationally spaced sub-elements of an element controls the elevational beam distribution for a decrease in elevation side-lobe-level. Varying the bias voltage as a function of an imaging mode allows for optimization of azimuthal apodization. Modulating a radio frequency signal with the bias voltage during a receive event modulates the received echo signal replacing a mixer for continuous wave operation. Changing the bias voltage substantially simultaneously with the beginning of a transmission of a waveform allows rapid change in bias level without transmitting undesired pressure waves. Applying the bias voltage at different polarities to sub-elements of the same element shields the transducer from electromagnetic interference (EMI) and avoids undesireable parasitic capacitance effects of a metal screen or electrode shield.

Figure 1:
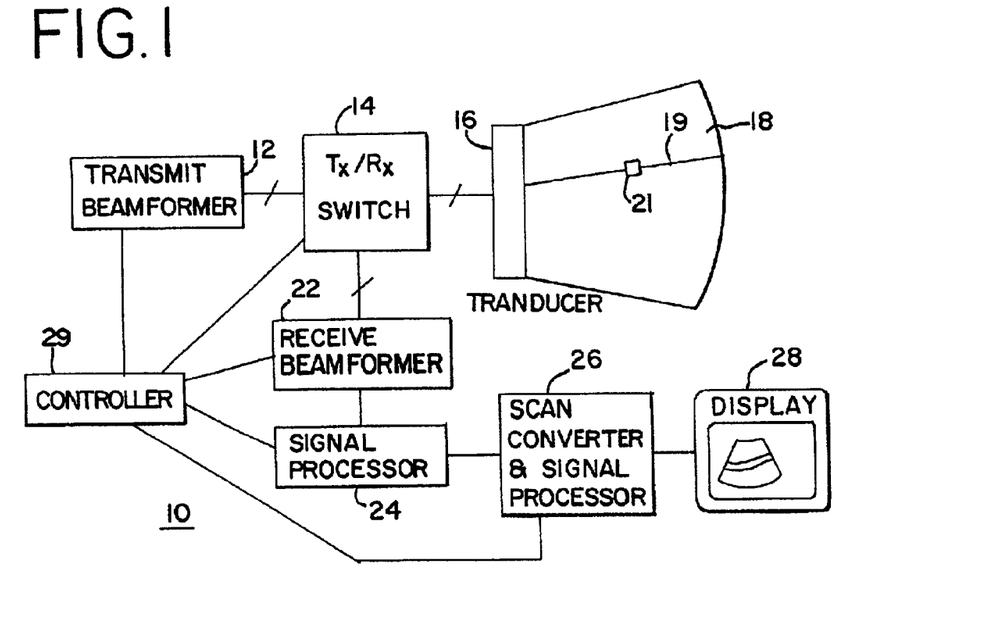
FIG. 1 is a block diagram of one preferred embodiment of an ultrasonic imaging system.

FIG. 1 shows a medical diagnostic ultrasound system 10 for use with an electrostatic transducer array 16 of multiple elements. The system 10 includes a controller 29 for coordinating generation of an image and control of bias provided to the electrostatic transducer array 16, a transmit beamformer 12, transmit and receive switches or a multiplexer 14, the electrostatic transducer array 16, a receive beamformer 22, a signal processor 24, a scan converter and signal processor 26 and a display 28.

The transmit beamformer 12 comprises a digital or analog transmit beamformer for generating transmit waveforms. For example, the transmit beamformer disclosed in the generator disclosed in Method and Apparatus For A Transmit Beamformer System, U.S. Pat. No. 5,675,554, the disclosure of which is incorporated herein by reference, is used. Other transmit beamformers, such as beamformers that generate uni-polar or bi-polar square waves, can be used.

The transmit beamformer 12 supplies excitation transmit waveforms via the multiplexer 14 to the electrostatic transducer array 16. The transmit beamformer 12 preferably includes N channels, one for each of the elements of the electrostatic transducer array 16. Alternatively, one channel may be connected to more than one transducer element, or some transducer elements are not connected to a channel. The excitation waveforms are apodized across the elements and focused along ultrasonic beams or lines in one of various formats, such as steered linear, sector, or Vector®. In one embodiment, a single beam is used for steered continuous wave operation, such as associated with a spectral Doppler mode. The transmit beamformer 12 preferably includes a bias voltage source for supplying a bias voltage to the electrostatic transducer 16. In alternative embodiments, the bias voltage source is separate from the transmit beamformer 12. During transmit, the bias voltage establishes a quiescent position of the membrane or diaphragm pulled partially toward the substrate by means of electrostatic attraction so that the transmit excitation can move the membrane either in or out from the quiescent position, creating either a rarefaction or compression wave. The higher the bias, the higher the possible outward displacement of the cMUT membrane. During receive, the bias voltage establishes a quiescent charge on the cMUT capacitance, Q, so that the incoming pressure wave moves the membrane or diaphragm in or out, increasing or decreasing the cMUT capacitance, C. The voltage, V, on the capacitance is modulated inversely to preserve the relationship, Q=CV. The higher the bias, the higher the absolute voltage change on the cMUT.

The electrostatic transducer array 16 comprises a multiple element CMUT array. The elements are arranged in one of various configurations, such as linear, curved linear, 1.5 dimensional, two dimensional or combinations thereof. As used herein, CMUTs include any kind of medical ultrasound vibrating acoustic wave transmitters/receivers which comprise one or more electrostatically charged membranes whose motion is primarily responsive to electrostatic (Coulomb) forces or whose motion results in modulation of the electrostatic potential. Such electrostatic transducers include micro-machined, micro-molded, or bonded membrane systems used as a transducer. For example, CMUTs include a micro-machined ultrasound transducer, utilizing electrically driveable vibrating micro-diaphragms or membranes made using micro-machining techniques, such as CMOS techniques. On each side of a dielectric gap chamber is a capacitor electrode. In one embodiment, a plurality of doped silicon membranes act as one electrode and a doped silicon substrate separated from the membranes act as the other electrode. The lateral (largest) dimensions of the diaphragm(s)/membrane(s) may be in the 50 micron range. Multiple layers of membranes may be provided, such as disclosed in U.S. Pat. No. 6,558,330 (U.S. application Ser. No. 09/731,597), the disclosure of which is incorporated herein by reference.

The electrostatic transducer array 16 is preferably of sufficient bandwidth to pass both fundamental and harmonic components thereof of an acoustical waveform and may include a mechanical focus, such as by use of an acoustic lens. The electrostatic transducer array 16 generates an ultrasonic transmit beam 19 in response to the transmit excitation waveforms, and this transmit beam 19 propagates outwardly through a subject 18 being imaged. The ultrasonic transmit beam 19 comprises a plurality of acoustic pressure waveforms, each of the plurality of waveforms is transmitted from an element of the electrostatic transducer array 16 in response to one of the transmit excitation waveforms. The ultrasonic transmit beam 19 corresponds to one or more electrical focal points. Based on delays, the plurality of waveforms are focused at a region along the ultrasound transmit line 19. The region comprises a point, area, volume, multiple points or a line. Generation of one or more transmit beams at one time is a transmit event and occurs during operation of the system 10 in the transmit mode.

The subject 18 being imaged, such as tissue or fluid of a patient, may include an added contrast agent. Any suitable contrast agent may be used. Preferably, the contrast agents absorb ultrasonic energy at a first frequency and radiate ultrasonic energy at a second frequency, different from the first frequency. In this example, the first frequency is referred to as the fundamental frequency, and the second frequency is a harmonic of the first frequency. As used herein, "harmonic" includes sub-harmonics and fractional harmonic energy (e.g. one-half or three-halves of the fundamental), as well as higher harmonics (e.g. two or three times the fundamental). Generally, harmonic frequencies are frequencies corresponding to non-linear propagation or scattering.

Instead of contrast agent harmonic imaging as discussed above, the techniques of the present invention may also be used for tissue harmonic imaging. In tissue harmonic imaging, no contrast agent is added to the subject 18, and the native non-linear characteristics of the tissue are relied on to create the ultrasonic image during an entire imaging session. A typical medical diagnostic ultrasound imaging session comprises imaging a patient for 15 to 30 minutes.

Ultrasonic energy propagated, scattered or radiated at harmonic frequencies, such as a band of frequencies corresponding to the second order harmonic of the transmitted fundamental frequency band, is received by the electrostatic transducer array 16. Ultrasonic energy corresponding to linear propagation and scattering (i.e. fundamental frequency band) is also received by the electrostatic transducer array 16. In response to the ultrasonic energy, the elements of the electrostatic transducer array 16 generate voltage signals. The voltage signals are provided to a receive beamformer 22. Reception of energy by the electrostatic transducer array 16 in response to a transmit event is a receive event and occurs during operation of the system 10 in the receive mode. For scanning a subject, multiple transmit and associated receive events are generated.

The receive beamformer 22 is of a construction known in the art, such as an analog or digital receive beamformer capable of processing signals associated with harmonic or fundamental frequencies. The receive beamformer 22 and the transmit beamformer 12 may comprise a single device. As known in the art, each voltage signal is delayed, apodized, and summed with other voltage signals. Each summed signal represents a region 21 in the subject 18. An ongoing stream of signals represents reflections from the ultrasound beam or line 19 received from the subject 18. After one receive event, signals representing the line 19 are obtained.

The receive beamformer 22 also demodulates the summed signals to baseband. Alternatively, demodulation is performed prior to summation. The demodulation frequency is selected in response to a fundamental or a harmonic frequency, such as a second harmonic frequency. The summed signals are demodulated to baseband by the selected frequency (the demodulation frequency). Signals associated with frequencies other than near baseband are removed by low pass filtering. As an alternative or in addition to demodulation, the receive beamformer 16 provides bandpass filtering. Thus, signals at frequencies other than a range of frequencies centered at or near the desired center frequency are filtered from the summed signals. The demodulated or filtered signal is passed to a signal processor 24 as a complex in phase and quadrature (I and Q) signal, but other types of signals such as real value signals may be passed.

The signal processor 24 comprises one or more processors for generating image information, such as spectral Doppler, color Doppler (e.g. velocity, energy, variance and combinations thereof), B-mode or M-mode information. The signal processor 24 is preferably a digital signal processor. Thus, information representing the intensity or other characteristics of the ultrasonic energy associated with the I and Q signals is generated.

The signal processor 24 outputs information to a scan converter and signal processor 26. The scan converter and signal processor 26 is of a construction known in the art and generates image information, such as B-mode image information. After scan conversion, information associated with an image is converted to a display value or values. The information is converted to the display value with a lookup table, as known in the art. Other display value generation devices may be used. Display values, or image information, is provided to a display 28 as known in the art. Thus, a two- or three-dimensional image, such as a B-mode image, is displayed.

Data from a plurality of ultrasound lines 19 is used to form each displayed image. A plurality of I and Q signals or samples representing different ranges or depths along the ultrasound line 19, such as the region 21, form each ultrasound line 19. For harmonic imaging, the energy transmitted from the transducer at harmonic frequencies is preferably minimized.

Figure 2:
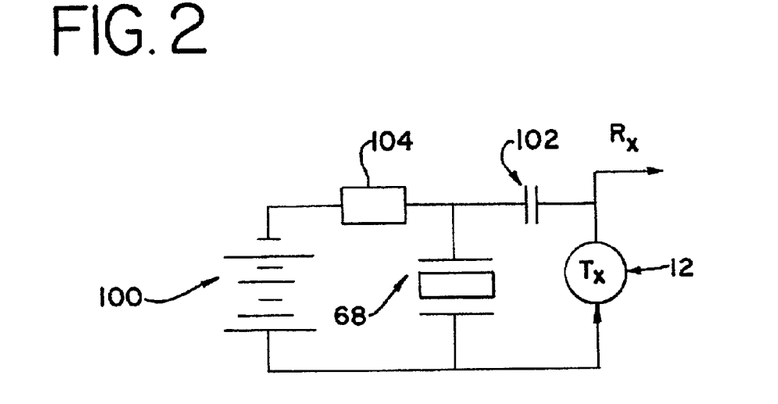
FIG. 2 is a block diagram representing one preferred embodiment for generating a bias.

To optimize the image information, the bias voltage for the transducer 16 is controlled. Referring to FIG. 2, the bias voltage for an electrostatic transducer element 68 is generated by a DC power supply 100, but AC or dynamic power supplies may be used. The DC supply 100 is programmable or at least provides selectable DC voltage levels. The bias voltage is connected directly to the element 68 or a sub-element while the AC ultrasonic signal or transmit waveform is coupled via a blocking series capacitor 102 which blocks DC current flow between the transmitter 12 and the DC power supply 100. A separate or the same DC power supply 100 connects to each of a plurality of elements 68 or sub-elements of the electrostatic transducer array 16.

Preferably, the DC power supply 100 does not short together the various elements 68 of the electrostatic transducer 16. For example, separate DC power supplies 100 are provided for each element 68 or sub-element. In another example, a high value series resistance 104 is provided between elements 68 or sub-elements. In yet another example, the bias is provided from charged capacitors connected to each element 68 or sub-element. Since the element capacitance is low, these charge holding capacitances, though large compared to the element capacitance, are still small. Resistors may be used to avoid having the charge holding capacitor load the transmitter or return echo. These capacitors are recharged sequentially between firings from the DC power supply 100 using an isolation switch. In another embodiment, the DC power supply 100 comprises a digital-to-analog converter (DAC). In response to control signals, the DAC outputs the bias voltage at one of various possible levels.

Various factors contribute to the appropriate bias voltages. For example, avoiding non-linear output of the transducer is a factor. The force, F, of the acoustic waveform generated by the electrostatic transducer array 16 is proportional to the square of the applied voltage, V, of the excitation waveform. This relationship is represented as $F=kV^2$, where K is a constant. The excitation waveform is represented as $V=1+a\sin(\omega t)$, where a is the amplitude of the AC component. The bias voltage is assumed to be unity in this example. Therefore, $F=k(1+2a\sin(\omega t)+a^2(\sin((\omega t))^2)$. The ratio of the non-linear generated response to the linear response of the electrostatic transducer 16 is 2/a. This ratio is greatest when the amplitude "a" is small as a fraction of 1 (the unity bias voltage level).

Other considerations are preferably accounted for to determine the appropriate bias voltage (e.g. DC bias voltage) and AC component. The bias voltage is limited by the supply available, safety restrictions, and transmit beamformer 12 and electrostatic transducer 16 breakdown voltage levels. Other restrictions on the bias voltage may be considered. The applied AC component is preferably as large as possible to maximize the returned echo signal. Any of various voltage levels may be used, such as appropriate for a particular ultrasound system or application and/or as restricted by government or other safety guidelines. In one example, the bias voltage is about 30 volts and the AC voltage is about 16 volts peak-to-peak.

The DC and AC voltages are preferably as high as safely possible. For example, an AC signal peak voltage that is 50% of the DC voltage is used (i.e. the peak-to-peak voltage is 100% of the DC voltage). Other relationships may be used, including smaller or larger amplitude DC or AC components. For example, the AC component voltage is 25% of the DC voltage (i.e. the peak-to-peak voltage is 50% of the DC voltage).

In one embodiment, the bias voltage is adjusted to compensate for differences in transmit and receive mode operation of the system 10. The limitation on the bias voltage discussed above are especially relevant during the transmit mode. Returning echo signals are much smaller than the transmitted AC component, so a higher bias voltage may be used in the receive mode without voltage breakdown or bottoming out of the electrostatic transducer elements. Using the higher bias voltage allows for more efficient operation of the electrostatic transducer 16, results in a lower source impedance, and allows for a more sensitive response by the electrostatic transducer 16.

Figure 3A:
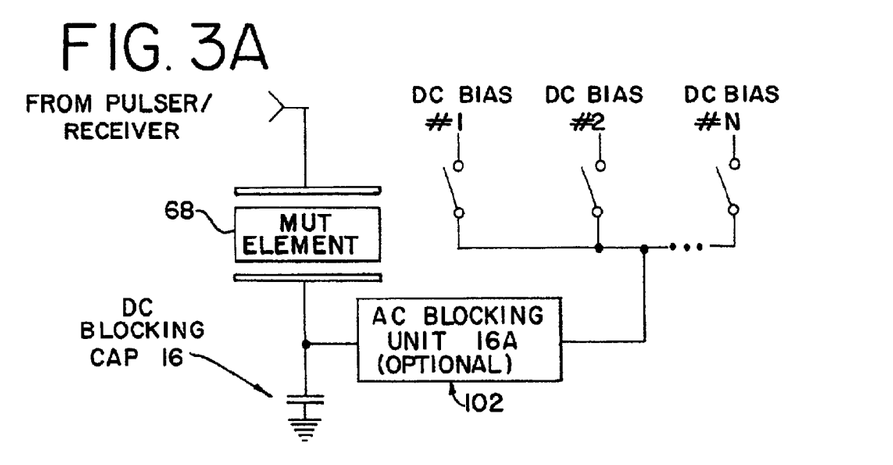
FIG. 3A schematically depicts one embodiment of a switchable voltage bias structure to adjust the center frequency of an electrostatic ultrasound transducer of a preferred embodiment.

FIG. 3A shows a capacitive micro-machined electrostatic transducer element at 68. Several voltage inputs 1, 2, ... N provide a particular bias voltage to the element 68. A first bias voltage 1 (e.g. 30 volts) is applied to the element 68 in the transmit mode. A DC blocking capacitor is also provided as an optional AC blocking unit 102. For reception, the second bias voltage 2 (e.g. 50 volts or 80 volts) is applied to the element 68.

Figure 3B:
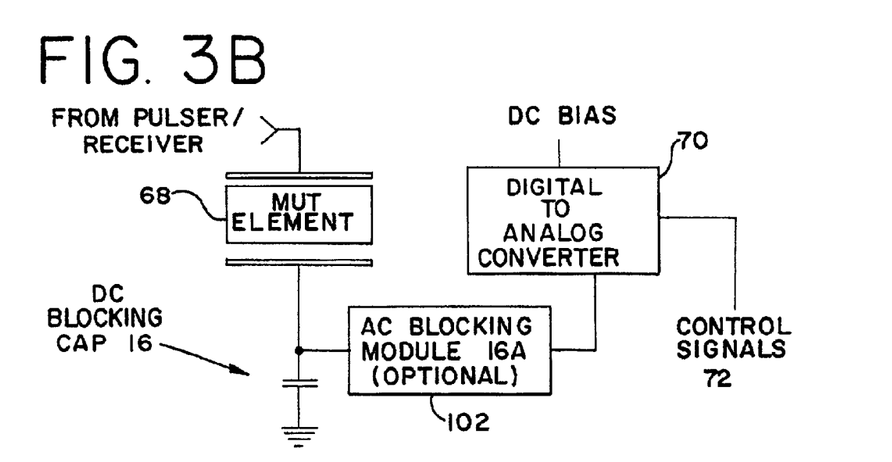
FIG. 3B schematically depicts a preferred embodiment of the biasing of FIG. 3A utilizing a digital/analog (DAC) converter comprising micro-machined switches and resistors to control voltage bias applied to the electrostatic transducer using a single source bias.

FIG. 3B depicts schematically another embodiment of the biasing of FIG. 3A. A DAC 70 comprising switches and resistors allows control of the bias voltage applied to the electrostatic transducer 16 using a single bias power source. By sending appropriate control signals 72 to the DAC 70, the bias voltage being applied to the micro-machined electrostatic transducer element 68 is varied. As an example, the single bias voltage source might be 200 volts and the DAC provides 16, 32 or another number of lesser reduced voltages. Furthermore, the DAC 70 may be constructed from micro-relays or micro-switches formed with the transducer and combined with resistors. The resistors may be laser-trimmed at manufacturing for extra precision during the setting of the values for each of the voltage choices.

Figure 4:
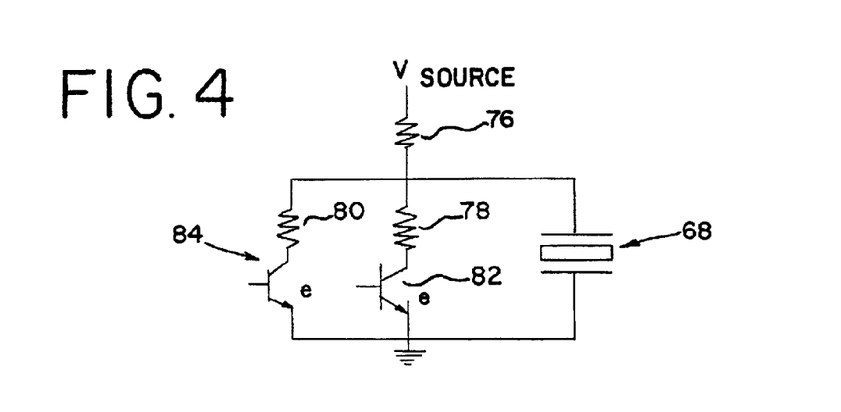
FIG. 4 is block diagram representing one preferred embodiments for applying different bias voltages to an electrostatic transducer array.

FIG. 4 shows another preferred embodiment for providing different bias voltages for transmit and receive modes of operation. A voltage source is connected through a resistor 76 to two additional resistors 78 and 80 connected in parallel with the electrostatic transducer element 68. Two switches 82 and 84 connect in series with the additional resistors 78 and 80, respectively. The resistors 76, 78, and 80 are selected to provide voltage division of the source bias voltage. The switches 82 and 84 control whether and to what amount the resistors 78 and 80 contribute to the voltage division of the bias voltage. For example, the source resistor 76 is 10 ohms and the additional resistors 78 and 80 are 10 and 100 ohms, respectively. One switch 82 associated with the 10 ohm additional resistor 78 is turned on during transmit and off during receive. The other switch operates inversely. The bias voltage is half of the source bias voltage during transmit and 0.91 of the source bias voltage during receive. Other circuit networks and resistor values may be used. In one embodiment, the switches 82 and 84 comprises transistors that may be switched on gradually by increasing the base-emitter voltage. In yet another embodiment, the switches 82 and 84 are implemented using a micro-electrical mechanical system (MEMS).

Figure 5:
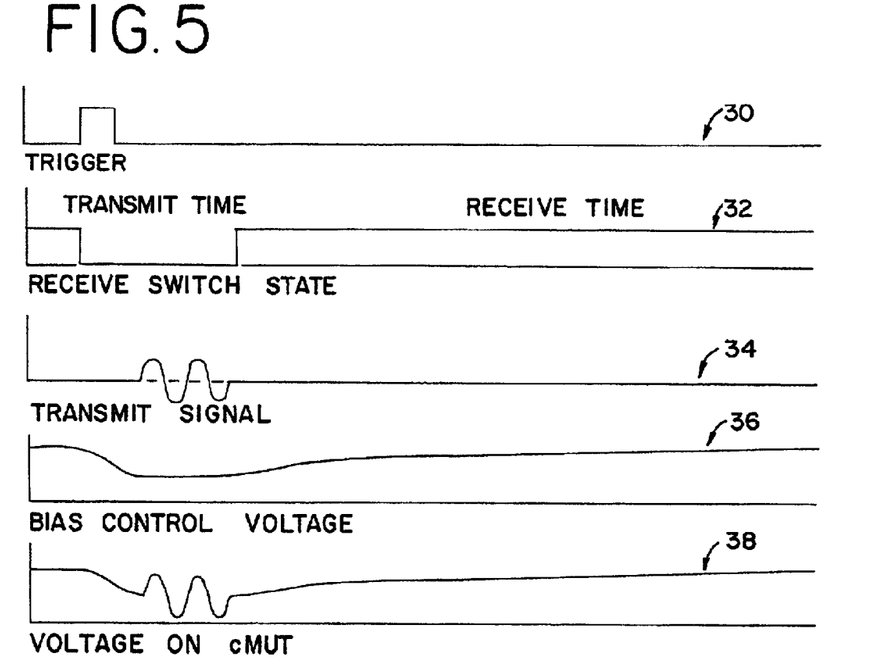
FIG. 5 is a timing diagram for operation of dynamic bias control.

FIG. 5 shows a timing diagram for dynamically switching between transmit and receive bias voltage levels. A control or trigger signal 30 indicates the beginning of a transmit event. In alternative embodiments, the trigger signal indicates the beginning of a receive event. In response to the trigger signal 30, the transmit/receive switch 14 connects the transmit beamformer 12 to the transducer 16 for a particular amount of time 32. During the transmit time, the transmit beamformer 12 generate the transmit waveform 34 in response to the trigger signal 30. Also in response to the trigger signal 30, the bias voltage 36 is reduced for transmission and then increased for reception. The bias voltage 36 increases and decreases gradually to avoid generating undesired acoustic waves.

The resulting voltage 38 at the transducer 16 includes a high receive event bias voltage and a low transmit event bias voltage with a superposed transmit waveform.

Another additional or alternative bias voltage control provides for rapid switching of the bias voltage between transmit and receive events with minimal artifacts. Changing the bias voltage rapidly may cause an unwanted pressure wave in the tissue and a resulting artifact in any image. A more gradual change of the bias voltage may avoid the unwanted pressure wave, but introduces an undesirable delay in changing between receive and transmit events.

Figure 7:
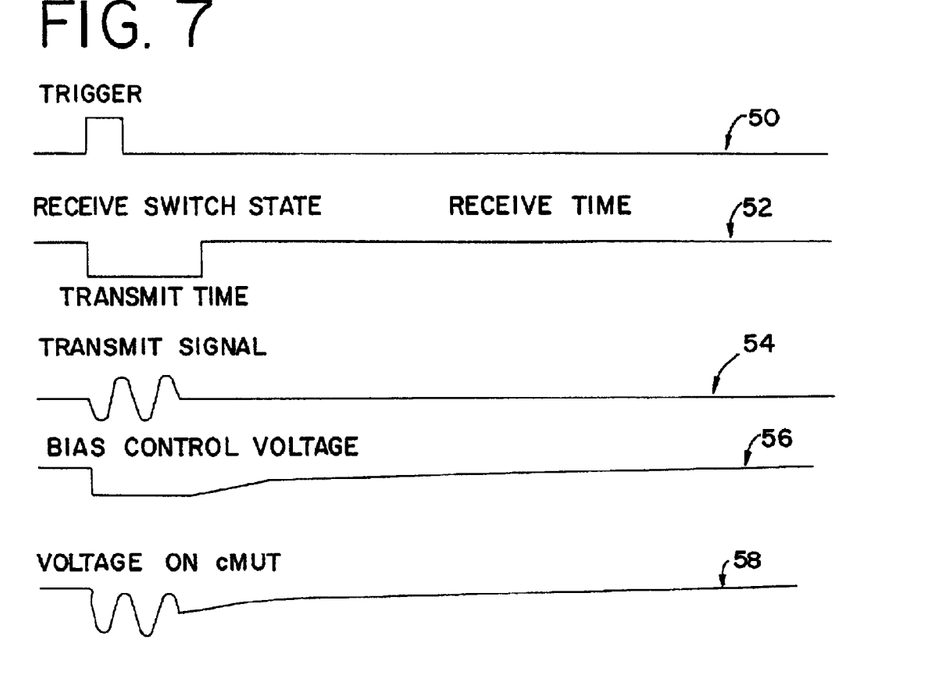
FIG. 7 shows one embodiment of a timing diagram for switching from a receive bias voltage to a lower transmit bias voltage.

To provide rapid changes of the bias voltage without delay, the bias voltage is changed substantially simultaneously with the beginning of the transmit waveform. FIG. 7 shows a timing diagram for dynamically and rapidly switching from a receive bias voltage to a lower transmit bias voltage. A control or trigger signal 50 indicates the beginning of a transmit event. In alternative embodiments, the trigger signal 50 indicates the beginning of a receive event. In response to the trigger signal 50, the transmit/receive switch 14 connects the transmit beamformer 12 to the transducer 16 for a, particular amount of time as represented by 52. During the transmit time, the transmit beamformer 12 generates the transmit waveform 54 in response to the trigger signal 50. The generated transmit waveform 54 begins with a decreasing voltage, such as the decreasing sinusoidal shown. Bi-polar, uni-polar, square and/or sinusoidal transmit waveforms may be used.

Also in response to the trigger signal 50, the bias voltage 56 is reduced for transmission and then increased for reception. The bias voltage 56 decreases rapidly at a same or substantially same time as the beginning of the transmit waveform 54. The step change in the bias voltage 56 is synchronized with the leading edge or beginning of the transmit waveform 54 in response to the trigger 50 and any delay and/or phasing applied to the transmit waveform 54. The decrease in bias voltage contributes to the transmit pressure of the transmit waveform, resulting in no or less of an artifact. In alternative embodiments, the bias voltage 56 is synchronized with the transmit waveform 54 in functions other than the step function, such as a sinusoidal function accounting for the first quarter or half wave of the desired transmit waveform 54.

The bias voltage 56 increases gradually during and/or after the transmit time represented at 52. In alternative embodiments, the bias voltage 56 increases rapidly in synchronization with the end of the transmit waveform 54. For example, the bias voltage 56 replaces a last quarter wave of the transmit waveform 54 ending at a positive peak.

The voltage 58 at the transducer 16 includes a high receive event bias voltage and a low transmit event DC voltage with a superposed transmit waveform. As shown, the rapid change of the bias voltage 56 is synchronized with the beginning of the transmit waveform 54.

In one embodiment, different triggers are provided for different elements 68. Since some transmit waveforms are delayed relative to other transmit waveforms, the bias voltage for each element is independently synchronized with the respective transmit waveform.

Other bias controls may be provided. For example, the frequency response of the electrostatic transducer 16 is affected by the bias voltage. The bias voltage controls the membrane tension, setting the restoring force during vibration. The bias also controls the electromechanical coupling coefficient which affects the mechanical damping of the transducer by the acoustic load. In one embodiment, the bias voltage is different for the transmit mode than for the receive mode of operation for receiving at harmonic frequencies of the fundamental transmit frequencies. A first bias voltage allows elements 68 to operate more efficiently at a low center frequency in transmit. For reception, a second bias voltage, such as a decreased voltage, differentially reduces the response of elements 68 at the transmitted frequency relative to the desired harmonic frequencies. For example, the transducer 16 operates at center transmit-frequency of 4.5 MHz in response, in part, to the bias voltage and receives at the higher second-order harmonic frequency of 9.0 MHz with 3 dB suppression of the transmitted frequency relative to 9.0 MHz when the bias voltage is reduced by 30%. Other frequencies and bias voltage differences can be used.

An additional or alternative dynamic bias voltage control is depth gain control. During a receive event, the bias voltage is varied as a function of time. The transmit/receive switch 14 and receive beamformer 22 are operated in a receive mode. During a single receive event, the variation as a function of time controls the gain, in part, as a function of depth along the line 19. The bias voltage is increased with increasing time or depth of receive focus. The bias voltage is increased by 50 volts or 100 percent from the beginning to the end of the receive event, but other ranges can be used. In one embodiment, the change in bias voltage provides about 5 dB of time dependent gain control. Higher signal-to-noise ratio as a function of depth may also be provided with the change in bias than can be achieved with a fixed bias.

The center frequency of the transducer is higher at lower bias levels. Using a lower bias in the near field matches the frequency response of the human body. The high center frequency response in the near-field matches the return echos having higher frequency content Improved low frequency response as the bias is increased for deeper depths when the return echos have had their high frequency content differentially attenuated by the human tissue response is also provided.

In the preferred embodiment, the bias voltage varies continuously during the receive event. In other embodiments, such as associated with switching structures, the bias voltage varies in discrete steps from a lower voltage to increasingly higher voltages during the receive event. A low pass filter smoothes the transitions to remove or avoid generating artifacts.

Figure 6:
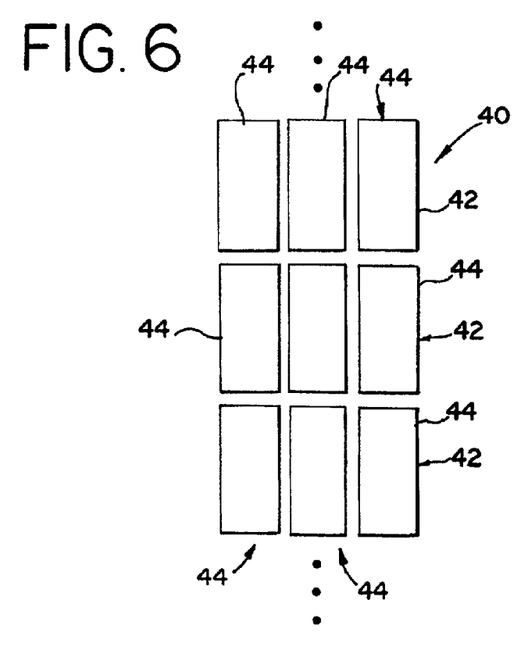
FIG. 6 shows an embodiment of an one dimensional transducer array having a plurality of azimuthally spaced elements.

Another additional or alternative bias voltage control provides a narrower or controlled focus in the elevation direction of the transducer array 16. FIG. 6 shows an one dimensional transducer array 40 having a plurality of azimuthally spaced elements 42 for transmission of acoustic energy along a range or depth dimension. Each of the elements 42 includes three elevationally spaced sub-elements 44. The sub-elements 44 are electrically isolated from other sub-elements 44, such as by using separate electrodes, limiting electrode connections or kerfing. In alternative embodiments, two or four or more elevationally spaced sub-elements 44 are provided for one or more elements 42 of the transducer array 40.

Different bias voltages are applied to one or more of the sub-elements 44 of the same element 42. For example, 50 volts are applied to the outer two sub-elements 44 of each element 42, and a higher 100 volts are applied to the inner sub-element 44 of each element 42 during receive. In alternative embodiments, different voltages are used, such as greater or lesser voltages. Any combination of relative voltage levels and single or grouped sub-elements 44 may be used. The different bias voltages along the elevation dimension provide amplitude apodization and may reduce elevation sidelobe levels during transmit or receive operation. For transmit mode operation, different or the same voltages for the sub-elements 44 are used. The differences between voltages for the sub-elements 44 may also vary as a function of transmit or receive mode of operation.

The bias voltages for the sub-elements 44 may also vary as a function of the imaging mode of operation. For example, higher bias voltages are provided for transmitting information for color Doppler imaging than for B-mode imaging. Where transmission of ultrasound energy is interleaved between two types of imaging modes, the bias voltage is varied as a function of imaging mode. Higher bias voltages for the lower amplitude color Doppler transmit events increase the bandwidth and provide for more efficient operation at lower frequencies. The bias voltage may also be varied for different transmit events in the same imaging mode as a function of the transmit event.

In one embodiment, a separate coupling capacitor for each sub-element 44 electrically connects the sub-elements 44 to the signal line for the corresponding element 42. A separate resistor connects each sub-element 44 to separate bias voltage lines. For N elements 42 each having M sub-elements 44, N signal lines, M DC voltage bias lines orthogonal to the signal lines, N×M capacitors and N×M resistors are provided. Such an arrangement allows for independent bias voltage control as a function of sub-element 44 elevation position within the element 42. In alternative embodiments, the elevation bias function is symmetrical. For example, outer pairs of sub-elements 44 on opposite sides of the center sub-element 44 are connected to receive the same bias voltage through the same resistor and capacitor.

Independent control of the bias voltage along the azimuth dimension may provide amplitude apodization for transmit or receive modes. For example, different bias voltages are applied to different elements 68 of the transducer array 16. The relative bias voltages are set in response to the apodization function for the particular imaging mode and scan line 19. Different bias voltages set for azimuthal aperture apodization are used for different imaging modes and scan lines. The bias voltage apodization function is the same or different for the amplitude apodization applied by the transmit or receive beamformers 12 and 22. In one example, the bias voltages vary by 50% from the center to an edge of the aperture for applying azimuthal apodization.

Another additional or alternative bias voltage control provides modulation of received signals for continuous wave modes of operation, such as spectral Doppler imaging. This control is applied to a single element transducer on a catheter or other disposable transducer. Acoustic energy is transmitted and echo signals received by the electrostatic transducer element. In continuous wave operation of this embodiment, transmit events and associated receive events occur simultaneously in the same element.

For receive, the bias voltage is modulated with an alternating signal. A radio or other frequency signal is added to or generated with the bias voltage. The alternating signal acts as the transmit signal as well. A signal source provides the radio frequency signal. For example, the transmit beamformer 12 also provides the radio frequency signal to the bias voltage source. Alternatively, the bias source includes a waveform generator or oscillator. The radio frequency signal is connected with the bias voltage to the element 68. The connection is either at the element 68, along a bias signal line or at the bias voltage source.

The radio frequency signal is applied with the bias voltage to the element 68. In one embodiment, the radio frequency signal amplitude is about 100% of the bias voltage.

The echo signals received by the element 68 are modulated as a function of the radio frequency signal. Modulation of the echo signals using the bias voltage may replace a mixer typically provided for continuous wave imaging. A low frequency digital-to-analog converter (DAC) samples the modulated signal for spectral processing. In one embodiment, the dynamic range of the DAC is selected to operate in the presence of large clutter signals, such as a DAC with 16 or 18 bits of resolution.

Another additional or alternative bias voltage control provides for electromagnetic interference (EMI) rejection. The capacitance of electrostatic or capacitive transducers 16 is small due to the air dielectric and the gap height, so parasitic capacitance from an EMI shield may degrade sensitivity or bandwidth. By dividing an element 68 into two sub-elements and reversing the polarity of the bias voltage applied to one of the two sub-elements, EMI signals become common mode signals on the two sub-elements and may be canceled by amplifying the difference between the signals of the two sub-elements.

Figure 8:
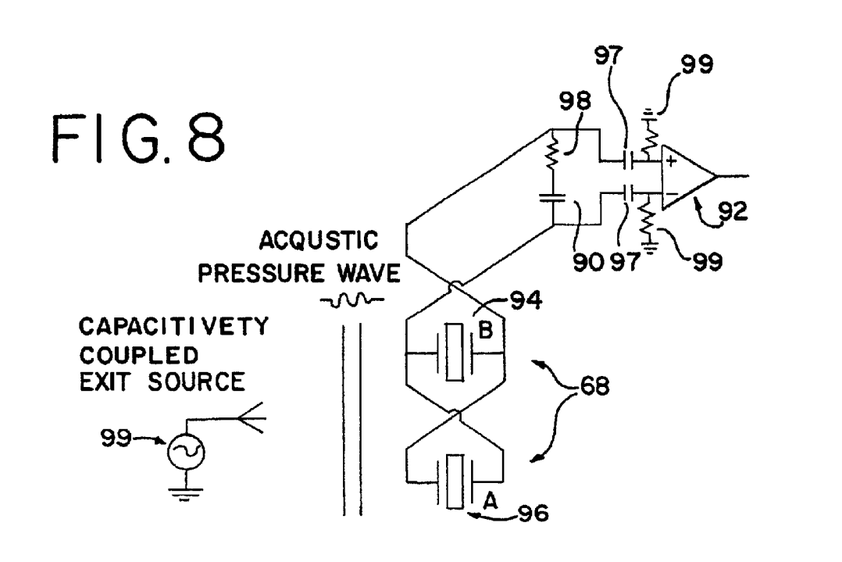
FIG. 8 shows one embodiment of a reverse polarity connection scheme for one element.

FIG. 8 shows a reverse polarity connection scheme for one element 68.

The micro-mechanical ultrasound element 68 connects with a bias voltage source 90 and a differential amplifier 92. The element 68 includes a plurality of cells or membranes and associated gaps as discussed above. Two groups of cells or membranes of the element 68 are electrically connected in at least two sub-elements 94 and 96, respectively. More than two sub-elements can be used for one or more of the elements 68. One, a sub-set or all of the elements 68 of the transducer 16 are configured with sub-elements 94 and 96.

The polarity of the bias voltage is reversed between the sub-elements 94 and 96. The bias voltage source 90 comprises any of the bias voltage sources discussed above or other dynamic or set voltage sources. A positive node of the bias voltage source 90 connects through a series resistor 98 to the membrane electrodes of one sub-element 94 and the substrate electrodes of the other sub-element 96. The negative node of the bias voltage source 90 connects to the membrane electrodes of the other sub-element 94 and the substrate electrodes of the one sub-element 96.

The differential amplifier 92 receives the echo signals from the sub-elements 94 and 96 with opposite polarity. The echo signals are input at the positive and negative terminals to the differential amplifier 92 as a function of the polarity of the sub-element 94, 96 as shown. The sub-elements 94, 96 have the same capacitive coupling to the EMI signal, represented at 99. As a result, the common mode rejection of the differential amplifier 92 cancels the EMI. The capacitive coupling to the EMI signal is balanced for maximum cancellation. For example, the sub-elements 94, 96 are arranged to have the same electrode area and associated wire length on the surface of the electrostatic element 68 facing outward from the transducer 16. As a result, the inverting and non-inverting nodes of the differential amplifier 92 are coupled the same to the EMI signal.

The echo response voltages from the sub-elements 94, 96 are inverted with respect to each other. The compression phase of the acoustic echo compresses both sub-elements 94, 96, modulating the biased cell voltages to a higher differential. Likewise, the expansion phase modulates the sub-elements 94, 96 to a higher differential. Since the polarity of the bias voltage is reversed, the differential amplifier 92 constructively combines the echo signals.

DC blocking capacitors 97 are provided in series with the inputs to the amplifier 92. Resistors 99 connect the amplifier inputs to ground. The DC blocking capacitors 97 and resistors 99 provide a high pass filter response at the inputs to the amplifier 92. DC blocking capacitors 97 without resistors may be used. Other more complex circuits may also be used.

Figure 9:
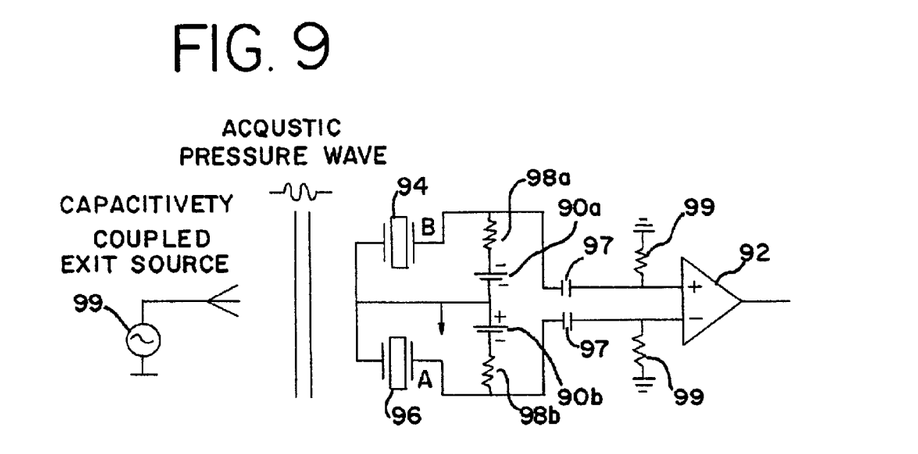
FIG. 9 shows an alternative embodiment of the reverse polarity scheme of FIG. 8.

FIG. 9 shows an alternative embodiment of the reverse polarity scheme for improved EMI rejection. Two separate bias voltage sources 100a, b provide bias voltage above and below the ground voltage. The two bias voltages 100a, b provide bias voltages with the same magnitude. Two corresponding resistors 98a, b are also provided for each of the negative and positive Bias voltages. The membrane electrodes may thus be grounded, allowing any coupled signal to be shorted and providing shielding the substrate electrodes. Any EMI signal which gets past the shield is still a common mode signal on the substrate electrodes and is reduced by the common mode rejection of the amplifier 90. The element impedance is four times as high for the embodiment of FIG. 9 than the embodiment of FIG. 8, so uncontrolled parasitic capacitance has a greater impact on performance for the configuration of FIG. 9 as compared to the configuration of FIG. 8.

Figure 10:
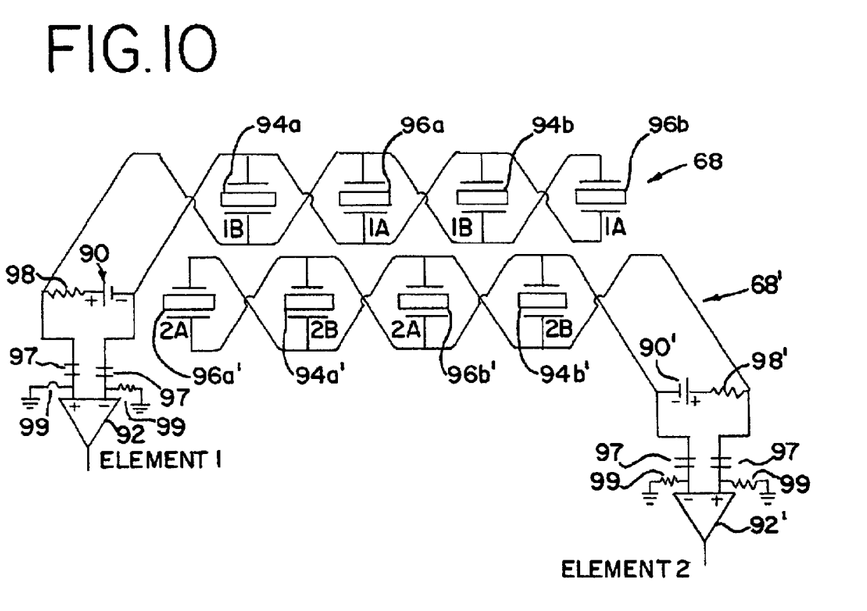
FIG. 10 shows positioning sub-elements of different elements to avoid electrical interference between elements in one embodiment.

FIG. 10 shows positioning sub-elements 94, 94', 96, 96' of different elements 68, 68' to avoid electrical interference between elements 68, 68' (i.e. avoid electrical crosstalk). The position of sub-elements 94, 96 relative to sub-elements 94', 96' of adjacent elements 68, 68' reduces interference of signals of one element 68 with signals of the other element 68'. For one element 68, each sub-element 94, 96 is further spatially separated into two or more groups (i.e. bias sub-elements) 94a, 94b and 96a, 96b at least along the edge of the element 68. For an adjacent element 68' of the transducer 16, each sub-element 94', 96' is spatially separated into two or more groups 94a', 94b' and 96a', 96b' at least along the common edge. Separate interconnected electrodes electrically connect the groups of each sub-element 94, 96.

The groups 94a, 94b, 96a and 96b of one element 68 are spatially off-set from the groups 94a', 94b', 96a' and 96b' of the other element 68', such as being shifted so that electromagnetic coupling between the elements 68, 68' is balanced. For example, the spatial off-set comprises patterning so that electrical connections (e.g. electrodes and connecting wires) of each group are substantially equally coupled to groups associated with opposite polarities of the other element 68'. For example, sub-element group 96a equally couples with the negative polarity bias voltage line of bias sub-element group 94a' and the positive polarity bias voltage line of bias sub-element group 96b' of the element 68'. Likewise, bias sub-element group 96a' equally couples with the positive polarity bias voltage line of bias sub-element group 94a and the negative polarity bias voltage line of the element 68. Other arrangements, such as a pattern similar to a common bond masonry pattern for balancing coupling between negative and positive polarity electrodes and/or lines between elements, can be used.

To use the same signal lines for transmitting acoustic energy from the transducer 16, differential transmit waveforms are used. In one embodiment, the transmit beamformer 12 includes transformers for inverting the transmit waveform. The inverted waveform is provided to one sub-element 94 and the non-inverted waveform is provided to the other sub-element 96. In alternative embodiments, separate transmit signal lines and bias voltage sources are provided and switchably connect with the sub-elements 94, 96 with a same polarity. The bias voltage for transmit events also switchably connects to the transmit signal lines. Separate transmit and receive lines require more space on the transducer 16 and any cable connecting the transducer 16 to the transmit beamformer 12.

Where the transmit beamformer 12 outputs uni-polar waveforms, then one of the sub-elements 96 is grounded. The non-grounded sub-element 94 transmits the acoustic energy.

Yet another additional or alternative control of the bias voltage measures and accounts for external force applied to the transducer 16. For example, the embodiments described in U.S. Pat. No. 6,461,299 (U.S. application Ser. No. 09/469, 994), filed Dec. 22, 1999, the disclosure of which is incorporated herein by reference, are included with any of the bias control embodiments discussed herein. The capacitance of the elements 68 is a function of pressure applied to the membranes of the elements 68. The capacitance is measured, and the bias voltage altered to account for increased or decreased pressure and avoid non-linear operation of the elements 68. Other aspects of U.S. Pat. No. 6,461,299 (U.S. application Ser. No. 09/469,994) can also be used, such as distorting the transmit waveform to account for non-linear operation of the transducer 16 and non-linear propagation.

One or more of the methods discussed above may be used with various other transmission schemes, including multiple pulse cancellation techniques. Multiple pulse cancellation techniques are discussed in U.S. Pat. No. 5,902,243 for an Ultrasonic Imaging Method With Multiple Pulse Cancellation, the disclosure of which is incorporated herein by reference. Examples of multiple pulse cancellation techniques are also disclosed in Hwang U.S. Pat. No. 5,706,819, Chapman U.S. Pat. No. 5,632,277 and by P. Jiang "A New Tissue Harmonic Imaging Scheme With Better Fundamental Frequency Cancellation And Higher SNR", 1998 Proc. IEEE Ultrasonics Symposium, pp 1589–1594.

While the invention has been described above by reference to various embodiments, it will be understood that many changes and modifications can be made without departing from the scope of the invention. For example, any combination of one or more of the bias voltage controls or variations discussed above may be used. As another example, various bias controls for transmit events, such as changing the bias voltage for transmit events, are implemented by incorporation into the transmit waveform. The bias voltage provided by the bias voltage source may be kept constant and the transmit waveform incorporates a DC off-set voltage to alter the bias voltage at the transducer element.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. An ultrasound method for operating a multiple element capacitive membrane ultrasound transducer (cMUT), the method comprising:
   (a) applying a bias voltage to a multiple element electrostatic transducer during one of a transmit and a receive event; and
   (b) varying the bias voltage as a function of time during the one of the transmit event and receive event.

2. The method of claim 1 wherein (a) comprises applying the bias voltage to each of a plurality of elements.

3. The method of claim 1 wherein (a) comprises applying the varied bias voltage during the receive event and further comprising:
   (c) applying a second bias voltage in a transmit mode different than the bias voltages of (a).

4. The method of claim 3 wherein (a) and (c) comprise applying the second bias voltage for transmission at a first frequency and applying the bias voltage of (a) for reception at a second frequency that is a harmonic of the first frequency.

5. The method of claim 1 further comprising:
   (c) applying aperture apodization as a function of different bias voltages for each of the multiple elements.

6. The method of claim 1 wherein (b) comprises controlling gain as a function of target depth.

7. The method of claim 1 wherein (b) comprises varying the bias voltage during a single receive event.

8. The method of claim 1 wherein (b) comprises increasing the bias voltage with increasing time.

9. The method of claim 1 further comprising:
   (c) applying different bias voltages to different elevationally spaced sub-elements of one of the multiple elements.

10. The method of claim 9 further comprising:
    (d) varying the bias voltage of (c) as a function of an imaging mode of operation.

11. The method of claim 5 further comprising:
    (d) varying the bias voltage of (c) as a function of an imaging mode of operation.

12. The method of claim 3 further comprising:
    (d) applying a transmit waveform to one of the multiple elements; and
    (e) changing from the bias voltage of (a) to the second bias voltage of (c) substantially simultaneously with a beginning of (d).

13. The method of claim 1 further comprising:
    (c) generating a radio frequency signal; and
    (d) applying the radio frequency signal with the bias voltage signal of (a).

14. The method of claim 1 further comprising:
    (c) reversing a polarity of the bias voltage of (a) for a sub-element of one of the multiple elements.

15. An ultrasound multiple element capacitive membrane ultrasound transducer (cMUT) system, the system comprising:
    at least one membrane ultrasound element configured to receive acoustic energy and output a responsive electrical signal; and
    a voltage bias source connected with the at least one membrane ultrasound element, the voltage bias source operative to vary a bias voltage as a function of time during one of a transmit event and a receive event.

16. The system of claim 15 wherein the voltage bias source comprises a digital-to-analog converter.

17. The system of claim 15 wherein the voltage bias source is operative to vary the bias during a receive event and apply a second bias voltage in a transmit mode, the second bias voltage different than the bias voltages during a receive mode.

18. The system of claim 17 wherein the voltage bias source is operative to apply the second bias voltage for transmission at a first frequency and applying the bias voltage for reception at a second frequency that is a harmonic of the first frequency.

19. The system of claim 15 wherein the voltage bias source is operative to apply aperture apodization as a function of different bias voltages for different ones of the multiple elements.

20. The system of claim 15 wherein the voltage bias source is operative to varying the bias voltage during a single receive event.

21. The system of claim 15 wherein the voltage bias source is operative to increase the bias voltage with increasing time.

22. The system of claim 15 wherein the at least one membrane ultrasound element comprises at least two elevationally spaced sub-elements; and
    wherein the voltage bias source is operative to apply different bias voltages to different ones of the elevationally spaced sub-elements.

23. The system of claim 15 wherein the voltage bias source is operative to vary the bias voltage as a function of an imaging mode of operation.

24. The system of claim 17 further comprising:
    a beamformer operative to apply a transmit waveform to the at least one membrane ultrasound element;
    wherein the voltage bias source is operative to change from the bias voltage of receive mode to the second bias voltage of the transmit mode substantially simultaneously with a beginning of the transmit waveform.

25. The system of claim 15 further comprising:

a signal source connected with the bias voltage source to the at least one-membrane ultrasound element, the signal source operative to generate a radio frequency signal.

26. The system of claim 15 wherein the at least one membrane ultrasound element comprises at least two sub-elements connected with the bias voltage source with a reversed polarity.

27. An ultrasound method for operating a multiple element capacitive membrane ultrasound transducer (cMUT), the method comprising:

(a) applying a first DC bias voltage to at least one of the multiple elements in a receive mode;

(b) applying a second DC bias voltage in a transmit mode, the second bias voltage different than the first bias voltages;

(c) applying a transmit waveform to one of the multiple elements in the transmit mode; and (d) changing from the first DC bias voltage to the second DC bias voltage substantially simultaneously with a beginning of the transmit waveform.

28. The method of claim 27 wherein (a) and (b) comprise applying the first and second DC bias voltages, respectively, to each of a plurality of the multiple elements.

29. The method of claim 27 wherein (d) comprises changing from the first DC bias voltage to the second DC bias voltage in synchronization with a leading edge of the transmit waveform.

30. The method of claim 27 wherein (b) comprises applying the second DC bias voltage for transmission at a first frequency and (a) comprises applying the first DC bias voltage for reception at a second frequency that is a harmonic of the first frequency.

31. The method of claim 27 further comprising:

(e) applying aperture apodization as a function of different bias voltages for each of the multiple elements.

32. The method of claim 27 further comprising:

(e) varying the first DC bias voltage as a function of depth.

33. The method of claim 27 wherein the second DC bias voltage is less than the first DC bias voltage and the beginning of the transmit waveform comprises a decreasing voltage.

34. The method of claim 27 further comprising:

(e) applying different bias voltages at one time to different elevationally spaced sub-elements of one of the multiple elements.

35. The method of claim 27 further comprising:

(e) varying the first and second DC bias voltages as a function of an imaging mode of operation.

36. The method of claim 27 further comprising:

(e) varying the first DC bias voltage as a function of time during a receive event.

37. The method of claim 27 further comprising:

(e) generating a radio frequency signal; and (f) applying the radio frequency signal with the first DC bias voltage.

38. The method of claim 27 further comprising:

(e) reversing a polarity of the first bias voltage for a sub-element of one of the multiple elements.

39. An ultrasound multiple element capacitive membrane ultrasound transducer (cMUT) system, the system comprising:

at least one membrane ultrasound element;

a beamformer operative to apply a transmit waveform to the at least one membrane ultrasound element; and a voltage bias source connected with the at least one membrane ultrasound element, the voltage bias source operative to change from a first DC bias voltage of a receive mode to a second different DC bias voltage of a transmit mode substantially simultaneously with a beginning of the transmit waveform.

40. The system of claim 39 wherein the voltage bias source comprises a digital-to-analog converter.

41. The system of claim 39 wherein the voltage bias source is operative to apply the second DC bias voltage for transmission at a first frequency and applying the first DC bias voltage for reception at a second frequency that is a harmonic of the first frequency.

42. The system of claim 39 wherein the voltage bias source is operative to apply aperture apodization as a function of different bias voltages for different ones of the multiple elements.

43. The system of claim 39 wherein the voltage bias source is operative to changing from the first DC bias voltage to the second DC bias voltage in synchronization with a leading edge of the transmit waveform.

44. The system of claim 39 wherein the at least one membrane ultrasound element comprises at least two elevationally spaced sub-elements; and wherein the voltage bias source is operative to apply different bias voltages to different ones of the elevationally spaced sub-elements.

45. The system of claim 39 wherein the voltage bias source is operative to vary the DC bias voltage in the receive mode as a function of an imaging mode of operation.

46. The system of claim 39 wherein the voltage bias source is operative to vary the first DC bias voltage as a function of time during a receive event.

47. The system of claim 39 further comprising:

a signal source connected with the bias voltage source to the at least one-membrane ultrasound element, the signal source operative to generate a radio frequency signal.

48. The system of claim 39 wherein the at least one membrane ultrasound element comprises at least two sub-elements connected with the bias voltage source with a reversed polarity.

* * * * *